Patented Nov. 23, 1943

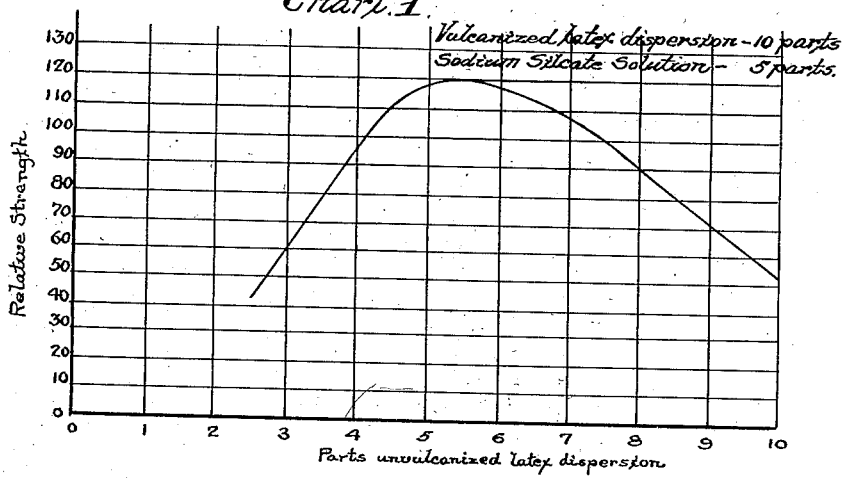
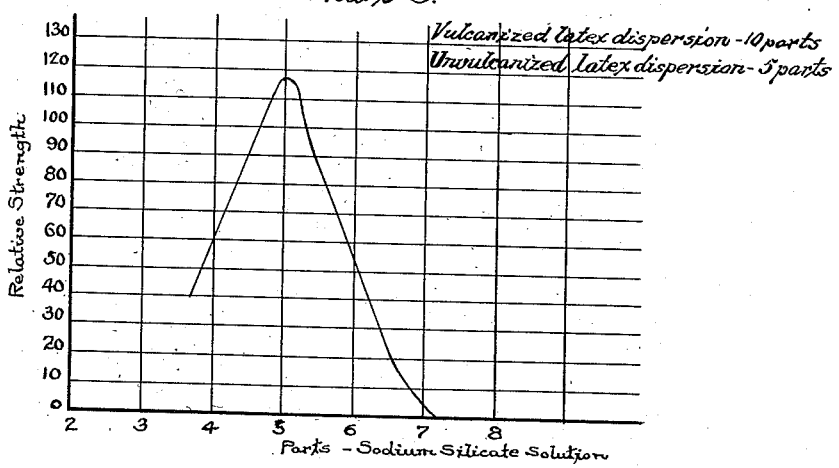
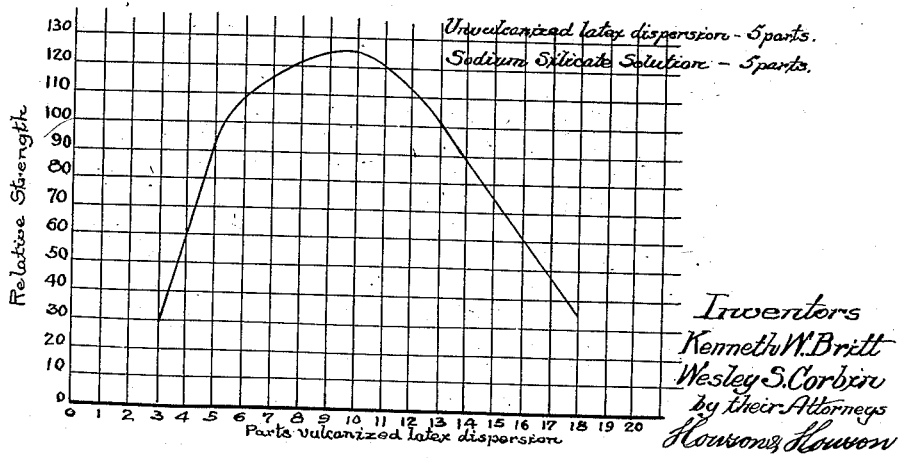

2,335,104

UNITED STATES PATENT OFFICE 2,335,104

LATEX ADHESIVE

Kenneth W. Britt, Norwood, and Wesley S. Corbin, Ridley Park, Pa., assignors to Scott Paper Company, Chester, Pa., a corporation of Pennsylvania Application February 6, 1940, Serial No. 317,614

6 Claims. (Cl. 260—728)

This invention relates to adhesives of the type disclosed in our application for patent, Serial Number 92,254, filed July 23, 1936, of which the present application is a continuation in part.

A principal object of the present invention is to provide an adhesive of new and generally improved characteristics, said adhesive being adapted for many useful purposes, including specifically the establishment of a strong and durable adhesive bond between non-porous surfaces.

More specifically, an object of the invention is to provide an adhesive compostion that will "set" or solidify without application of heat or means for evaporation.

Another object of the invention is to provide an adhesive that shall be productive of a bond of extreme strength, toughness, durability, and resistance to shock and vibration.

Still another object of the invention is to provide an adhesive of the above-named characteristics that shall yet be capable of being stripped or otherwise removed from the surface or surfaces to which it may be applied without damaging or marring the latter.

A further object is to provide an adhesive that shall be productive of a bond substantially immune to the effects of any reasonable degree of heat, of light, moisture, and the conventional solvents.

A still further object of the invention is to provide an adhesive of the characteristics set forth that shall have relatively rapid "setting" characteristics.

The invention further provides a fundamentally new process or method for establishing an adhesive bond between two non-porous solid surfaces, as hereinafter specifically described.

For successful use for certain purposes, an adhesive must be capable of producing a strong, durable, and flexible bond when applied to the smooth non-porous surfaces of metal, glass, tile, marble, and plastics, and also to painted surfaces. It should further have in pronounced degree all of the other characteristics set forth above, i. e., immunity to the effects of water, light, chemicals and a reasonably high degree of heat, ability to "set" rapidly to a solidified state without the application of heat or provision of means for evaporation of the plasticizing mediums, and capability of complete removal from the surfaces to which it adheres without damage to the latter; and the bond should be capable of withstanding over extended periods of time recurrent severe strains and shocks. We have discovered that certain compositions containing rubber in the form both of vulcanized and unvulcanized latex, or latex in a state of partial vulcanization, when properly prepared and when manipulated in accordance with the process hereinafter described are capable of producing adhesive bonds having all of the foregoing characteristics.

Unvulcanized or unvulcanizing rubber latex compounds after "setting up" in film form have little or no affinity for or tendency to adhere to smooth surfaces. If on the other hand all of the latex in the compound is vulcanized, we have found that, while there seems to be a very great affinity for the smooth surface, the film itself is weak and has a tendency to crumble. We have found, further, that if vulcanized and unvulcanized rubber latices in water dispersion and in association with sodium silicate are compounded with a substance, such as commercial aluminiferous cement, which is capable of coagulating the latex and of mixing with and disassociating the water from the latex and of chemically combining with said water, the resulting material is capable without application of heat or any means of evaporation of producing a film that adheres tenaciously to any hard surface with which the material is in contact during the "setting" period, and in itself possesses extreme strength, toughness and durability. In this process the change from the initial plastic condition of the compound to its final firm, strong and solid condition takes place by means of a chemical or physiochemical reaction between the two compositions, i. e., the latex composition and the aluminiferous cement, which together form the adhesive material and which are mixed together immediately prior to use. The adhesive is, therefore, "self-setting," in that the transition from the plastic to the solid state takes place without the agency of heat, light, air, evaporation, or the removal or addition of any substance from or to the film during the transition period, and in this respect the process differs fundamentally from those involved in the formation of adhesive films from the conventional adhesives. The reaction starts at the moment the two components are mixed and proceeds at a rate affording ample time for spreading the adhesive material upon the surfaces to be attached but with sufficient rapidity to afford the bond a high degree of strength in a relatively short time.

In a specific example, vulcanized and unvulcanized rubber latices are mixed together with sodium silicate in the following proportions:

| | Parts by weight |
|---|---|
| Concentrated unvulcanized latex of rubber content 60% to 70% | 1 |
| Vulcanized latex of 60% rubber content | 2 |
| Sodium silicate solution of approximately 60% solids content | 1 |

These materials are individually available in commerce. A suitable unvulcanized latex compound in stabilized and prepared form is known in the trade as Concentrolac, and may be obtained from the Heveatex Corporation, Melrose, Mass. It consists of a latex that has been centrifuged and then creamed to approximately the rubber content given. A suitable vulcanized latex of the 60% rubber content is produced by the Vultex Corporation, of Cambridge, Mass., and is marketed under the name Vultex F 487. The sodium silicate is a high caustic concentrated silicate containing about 60% solids in the ratio of $3Na_2O$ to $2SiO_2$, this character of silicate being most suitable for the purpose and producing the most satisfactory results. In compounding this liquid, the latices are first thoroughly mixed together and the sodium silicate then added very slowly to the latex mixture, first thoroughly mixing in not more than one-third of the total silicate. This has a thickening action on the latex, and until this thickening action has taken place, the latex is extremely sensitive to the addition of any large quantities of silicate. If this fluid mass is to be stored for any length of time before using, some dispersion material, such as bentonite, should be added to the liquid to prevent the ingredients, especially the silicate, from separating out. This material should be thoroughly mixed into the silicate before the latter material is added to the latex.

In conjunction with the above fluid composition, we may employ a commercial aluminiferous cement powder of a type used in refractory materials having a chemical composition substantially as follows:

| | Per cent |
|---|---|
| Silica $(SiO_2)$ | 2.7 |
| Iron oxide $(FeO)$ | 16.0 |
| Aluminum oxide $(Al_2O_3)$ | 44.0 |
| Calcium $(CaO)$ | 35.0 |
| Magnesium oxide $(MgO)$ | 0.50 |
| Sulfur trioxide $(SO_3)$ | 0.3 |

A commercial aluminiferous cement of this chemical composition is available in commerce, being produced by The Atlas Lumnite Cement Co., Inc., of New York, and sold under the tradename "Lumnite." This powder when added to the fluid composition described above has the faculty of mixing readily with the latex mixture and by combining chemically with the water of withdrawing the latter from the latex. The presence of the sodium silicate prevents a too rapid coagulation of the latex and maintains homogeneity in the mass. In practice, the aluminiferous cement may be added in approximately equal parts by weight to the latex composition just prior to the application of the adhesive, and the disassociation of the water from the latex and the coagulation of the latter progresses gradually and uniformly over the "setting" period, eventually leaving a film apparently dry and having the characteristics described above. An anti-oxidant is preferably added to the composition to preserve the finished bond in accordance with the conventional practice.

The attached drawing illustrates graphically the approximate extent to which the strength of the adhesive is affected by variation in the relative proportions of the various ingredients. Collectively the charts show that maximum adhesive strength is obtained when the three ingredients, namely, vulcanized latex, unvulcanized latex and sodium silicate, are present approximately in the relative proportions of ten parts to five parts to five parts, respectively, in accordance with the specific formula given above. Chart No. 1 shows the effect upon the strength of the adhesive of varying the relative amount of the unvulcanized latex component; chart No. 2 illustrates similarly the effect of varying the relative amount of the vulcanized latex component; and chart No. 3 illustrates the effect of varying the relative amount of the sodium silicate. Obviously some degree of latitude is afforded in the relative proportions of the ingredients without undue loss in the desirable characteristics of the adhesive. We have found, in general, that the unvulcanized component should be not less than 20% nor more than 50% by weight of the combined dispersions; and that the sodium silicate solution should fall within the range of 20% to 30% by weight of the mixture of the latex dispersions and silicate solution.

It is to be noted that in each instance, the charted adhesive was produced by adding to the latex-silicate composition an approximately equal weight of aluminiferous cement. The relative amount of cement is not critical, however, and may vary considerably without unduly affecting the strength and other characteristics of the adhesive. The quantity of cement should be sufficient, at least, to combine with the water content of the mixture to form a substantially dry compound. In general, we prefer to maintain the cement between the limits of say 75% to 150% by weight of the latex-silicate composition. It will be noted further that the specific formula given above affords an adhesive of substantially maximum strength and at the same time a convenient relative apportionment of the ingredients in the latex-silicate composition. It will be apparent, however, that there is a considerable permissible latitude, particularly as to the two latex components, and that an adhesive of definitely superior characteristics may be obtained from formulae departing substantially from that set forth.

An adhesive made in accordance with the aforedescribed invention exhibits an extremely high tensile strength, and shows no deterioration even after extended periods of use under widely varying conditions. It is, therefore, well adapted for supporting relatively heavy loads in permanent or semi-permanent installations of various characters. An outstanding characteristic is its ability to set to relatively great, though not maximum, strength within a relatively short period after application. Within forty-eight hours, for example, the adhesive will resist a force tending to separate two surfaces to which it has been applied, and exerted in a direction substantially normal to said surfaces, of approximately or in excess of one hundred pounds per square inch. The strength of the adhesive increases rapidly to approximately or in excess of two hundred pounds per square inch at the end of fourteen days, as measured in the same manner.

We claim:

1. A "self-setting" flexible adhesive compounded essentially of a mixture of concentrated aqueous dispersions of vulcanized and unvulcanized rubber latices, of which mixture the unvulcanized component constitutes from 20% to 50% by weight; a concentrated aqueous solution of sodium silicate in amount to form from 20% to 30% by weight of the combined solution and dispersions; and aluminiferous cement in amount to combine with the combined water content of the said dispersions and solution.

2. A "self-setting" flexible adhesive compounded essentially of a mixture of concentrated aqueous dispersions of vulcanized and unvulcanized rubber latices, of which mixture the unvulcanized component constitutes from 20% to 50% by weight; a concentrated aqueous solution of sodium silicate in amount to form from 20% to 30% by weight of the combined solution and dispersions; and aluminiferous cement in amount of approximately 75% to 150% of the combined weight of the said dispersions and solution.

3. A "self-setting" flexible adhesive compounded essentially of a mixture of an aqueous dispersion of vulcanized rubber latex of approximately 60% rubber content, with an aqueous dispersion of unvulcanized rubber latex having a rubber content in the neighborhood of 60% to 70%, of which mixture the unvulcanized component constitutes from 20% to 50% by weight; an aqueous solution of sodium silicate of approximately 60% solids content in amount to form from 20% to 30% by weight of the combined solution and dispersion; and aluminiferous cement in amount of approximately 75% to 150% of the combined weight of said dispersions and solution.

4. A "self-setting" flexible adhesive compounded essentially of a mixture of an aqueous dispersion of vulcanized rubber latex of approximately 60% rubber content, with an aqueous dispersion of unvulcanized rubber latex having a rubber content in the neighborhood of 60% to 70%, of which mixture the unvulcanized component constitutes from 20% to 50% by weight; an aqueous solution of sodium silicate of approximately 60% solids content in amount to form from 20% to 30% by weight of the combined solution and dispersion; and aluminiferous cement in amount to combine with the combined water content of the said dispersions and solution.

5. A "self-setting" flexible adhesive compounded of approximately five parts by weight aqueous dispersion of unvulcanized latex having a rubber content in the neighborhood of 60% to 70%; approximately ten parts by weight aqueous dispersion of vulcanized latex of approximately 60% rubber content; approximately five parts by weight sodium silicate solution of approximately 60% solids content; and an amount of aluminiferous cement approximately equal in weight to the combined dispersions and solution.

6. A "self-setting" flexible adhesive compounded of approximately five parts by weight aqueous dispersion of unvulcanized latex having a rubber content in the neighborhood of 60% to 70%; approximately ten parts by weight aqueous dispersion of vulcanized latex of approximately 60% rubber content; approximately five parts by weight sodium silicate solution of approximately 60% solids content; and aluminiferous cement in an amount of approximately 75% to 150% of the combined weight of said dispersions and solution.

KENNETH W. BRITT.
WESLEY S. CORBIN.